United States Patent
Garcia Martin et al.

(10) Patent No.: US 10,071,507 B2
(45) Date of Patent: Sep. 11, 2018

(54) METHOD AND DEVICE FOR MANUFACTURING A COMPOSITE PART OF AN AIRCRAFT

(71) Applicant: Airbus Operations S.L., Getafe (ES)

(72) Inventors: Diego Garcia Martin, Getafe (ES); Pablo Cebolla Garrofe, Getafe (ES); Francisco Javier Chamorro Alonso, Getafe (ES); Felix Dominguez Escauriaza, Getafe (ES)

(73) Assignee: Airbus Operations S.L., Getafe (ES)

( * ) Notice: Subject to any disclaimer, the term of this patent is extended or adjusted under 35 U.S.C. 154(b) by 357 days.

(21) Appl. No.: 14/700,677

(22) Filed: Apr. 30, 2015

(65) Prior Publication Data
US 2015/0314487 A1   Nov. 5, 2015

(30) Foreign Application Priority Data

Apr. 30, 2014   (EP) .................... 14382161

(51) Int. Cl.
*B29C 33/20* (2006.01)
*B29C 70/34* (2006.01)
(Continued)

(52) U.S. Cl.
CPC .......... *B29C 33/202* (2013.01); *B29C 70/345* (2013.01); *B29C 70/46* (2013.01);
(Continued)

(58) Field of Classification Search
CPC ..... B29C 33/202; B29C 70/345; B29C 70/46; B29K 2063/00; B29K 2105/0872;
(Continued)

(56) References Cited

U.S. PATENT DOCUMENTS 6,759,002 B1   7/2004   Engwall et al.
2003/0218267 A1*  11/2003   Husmann .............. B29C 70/443
264/101
(Continued)

FOREIGN PATENT DOCUMENTS

GB   1373344   11/1974

OTHER PUBLICATIONS

European Search Report, dated Oct. 24, 2014.

*Primary Examiner* — Kirsten Jolley
(74) *Attorney, Agent, or Firm* — Greer, Burns & Crain, Ltd.

(57) ABSTRACT

A method for manufacturing a composite part of an aircraft comprising the steps of placing a prepreg preform in a molding die between at least a molding die base part and a molding die upper part, debulking the air trapped in the prepreg, displacing the molding die upper part against the molding die base part in a direction perpendicular to the plane of the prepreg preform such that the molding die upper part presses the laminated perform until it reaches a blocking arrangement defining the position of the upper part relative to the base part for giving the prepreg preform the nominal thickness of the cured part, wherein said displacement is achieved by bolting the different parts of the molding die against each other, providing an elevated temperature to the preform such that it is cured.

14 Claims, 3 Drawing Sheets

SEC. K-K

(51) Int. Cl.
  *B29C 70/46*  (2006.01)
  *B29K 105/08* (2006.01)
  *B29K 63/00*  (2006.01)
  *B29L 31/30*  (2006.01)

(52) U.S. Cl.
  CPC .. *B29K 2063/00* (2013.01); *B29K 2105/0872* (2013.01); *B29L 2031/3076* (2013.01); *Y02T 50/43* (2013.01); *Y10T 428/2419* (2015.01)

(58) Field of Classification Search
  CPC ....... B29L 2031/3076; Y10T 428/2419; Y02T 50/433; Y02T 50/43
  USPC ................................................ 264/257, 320
  See application file for complete search history.

(56) References Cited

U.S. PATENT DOCUMENTS

| | | |
|---|---|---|
| 2008/0124520 A1 | 5/2008 | Kondo et al. |
| 2012/0073489 A1 | 3/2012 | Roberts |
| 2013/0093126 A1 | 4/2013 | Masini et al. |
| 2014/0197567 A1* | 7/2014 | Plante .................... B29C 70/48 264/219 |
| 2016/0032939 A1* | 2/2016 | Anderson ............... B29C 70/34 416/230 |

\* cited by examiner

SEC. K - K

METHOD AND DEVICE FOR MANUFACTURING A COMPOSITE PART OF AN AIRCRAFT

CROSS-REFERENCES TO RELATED APPLICATIONS

This application claims the benefit of the European patent application No. 14382161.9 filed on Apr. 30, 2014, the entire disclosures of which are incorporated herein by way of reference.

BACKGROUND OF THE INVENTION

The present invention refers to a composite manufacturing method and device to be applied in composite part manufacturing processes. It might apply to both structural parts, such as ribs, and parts where both tight tolerances and excellent structural behavior are required, such as fittings.

Current composite material curing processes require the combined effort of pressure and temperature to ensure the quality of the final part. The combination of both factors takes place in autoclaves or ovens.

A curing process generally needs pressure, debulking and a high temperature. Pressure is needed to ensure a correct distribution of the resin and good compaction between the prepreg layers in the workpiece. Debulking is needed to draw air from the workpiece to obtain good compaction and avoid porosity. Temperature is needed to polymerize the resin because firstly the resin becomes liquid and is distributed through the mold and then it begins to polymerize until it gets hard.

Epoxy prepreg materials, which present excellent mechanical properties, require pressure and temperature to be shaped and cured and they are used to obtain all sorts of aeronautical parts, ranging from fittings to aerodynamic surfaces. Therefore, manufacturing an epoxy part requires a big amount of energy and gas. The final acceptance of the part depends on its structural integrity, which is evaluated in terms of porosity levels and it also depends on its fit to the dimensional and geometrical tolerances defined for said element. Integrity is deeply dependent on the process parameters, time, pressure, vacuum, material, etc., while geometry is concerned by several factors such as tooling, stacking sequence and also the kind of material used.

Ovens, on the other hand, are normally used in processes where pressure is applied by injection equipment, such as Resin Transfer Moulding (RTM) or Liquid Resin Infusion (LRI). Those injection processes compensate the normally lower levels of injection pressure when compared to standard autoclave cycles with higher levels of vacuum. Although RTM parts present worst mechanical behavior than those made out of prepregs in autoclaves, an RTM process provides parts with tighter geometrical tolerances that makes RTM an ideal technology to manufacture parts with geometrical assembly requirements.

There are processes, such as Same Qualified Resin Transfer Moulding (SQRTM), that combines the benefits of RTM regarding tight tolerances and prepreg regarding mechanical properties, although they still require the presence of both temperature and pressure that implies the use of costly equipment.

SUMMARY OF THE INVENTION

The above mentioned drawbacks are solved by the claimed method and device that provides advantages in terms of manufacturing.

The manufacturing method of the invention tries to elude the use of complex equipment, more specifically the use of an autoclave, to provide the pressure that the prepreg preform requires to cure properly.

The method of the invention comprises the steps of:
placing a prepreg preform in a molding die between at least a molding die base part and a molding die upper part, said molding die having the shape of the composite part to be produced,
debulking the air trapped into the prepreg preform,
displacing the molding die upper part downwards against the molding die base part, in a perpendicular direction to the plane of the prepreg preform such that the molding die upper part presses the laminated perform until it reaches a blocking means defining the position of the upper part relative to the base part for giving the prepreg preform the nominal thickness of the cured part, wherein said displacement is achieved by bolting the different parts of the molding die against each other,
providing temperature to the prepreg preform such that it is cured.

Pressure is achieved by applying a bolting torque to the parts of the molding die against each other, for instance, or to another part of the molding die or even to a tool element so that the tool element presses and displaces said part of the molding die.

The blocking means provide the limit position of the molding die such that the molding die upper and lower parts define in-between themselves a cavity having the nominal thickness of the composite part. The molding die parts are moved until they reach a position defined by said blocking means. This position is the position defining the nominal thickness of the cured part because the thickness of the preform before curing is greater than the nominal thickness of the cured piece.

Therefore pressure is provided by bolting the different parts of the molding die against each other so that the molding die presses the laminated preform thanks to said bolting torque, hence an autoclave is not required.

Although it increases the tooling costs, as it does not require an autoclave, this method significantly reduces manufacturing costs of every part. Consequently, it is a process for manufacturing parts with excellent mechanical properties, very tight geometrical tolerances and reducing recurring costs.

Molding dies provide the geometry of the part, while the pressure required to properly cure the part is provided by bolting the different parts of the molding die so that they are displaced until they reach the nominal thickness of the cured piece. The bolting torque and its corresponding displacement of the molding die part can also be achieved by adding a tool element in contact with said part of the molding die and applying the bolting torque to said tool element.

Additionally, the invention also comprises the step of placing molding die lateral parts in case the composite part to be produced has a main body and flanges, said flanges being defined by the shape of the lateral modules of the molding die.

It is also an object of the present invention to provide a device for manufacturing a composite part, said device comprising a molding die for placing a prepreg preform, said molding die having the shape of the composite part to be produced and at least a base part and an upper part for locating in-between the prepreg preform, characterized in that it further comprises:

bolts joining the different parts of the molding die wherein the molding die upper part is displaceable against the molding die base part applying a bolting torque to said bolts, and blocking means of the displacement of the molding die upper part defining the position of the upper part relative to the base part for giving the prepreg preform the nominal thickness of the cured part.

Another advantage of the claimed method and device is that it is controllable and repetitive.

BRIEF DESCRIPTION OF THE DRAWINGS

To complete the description and in order to provide for a better understanding of the invention, a set of drawings is provided. Said drawings form an integral part of the description and illustrate preferred embodiments of the invention. The drawings comprise the following figures.

DETAILED DESCRIPTION OF THE PREFERRED EMBODIMENTS

Figure 1:
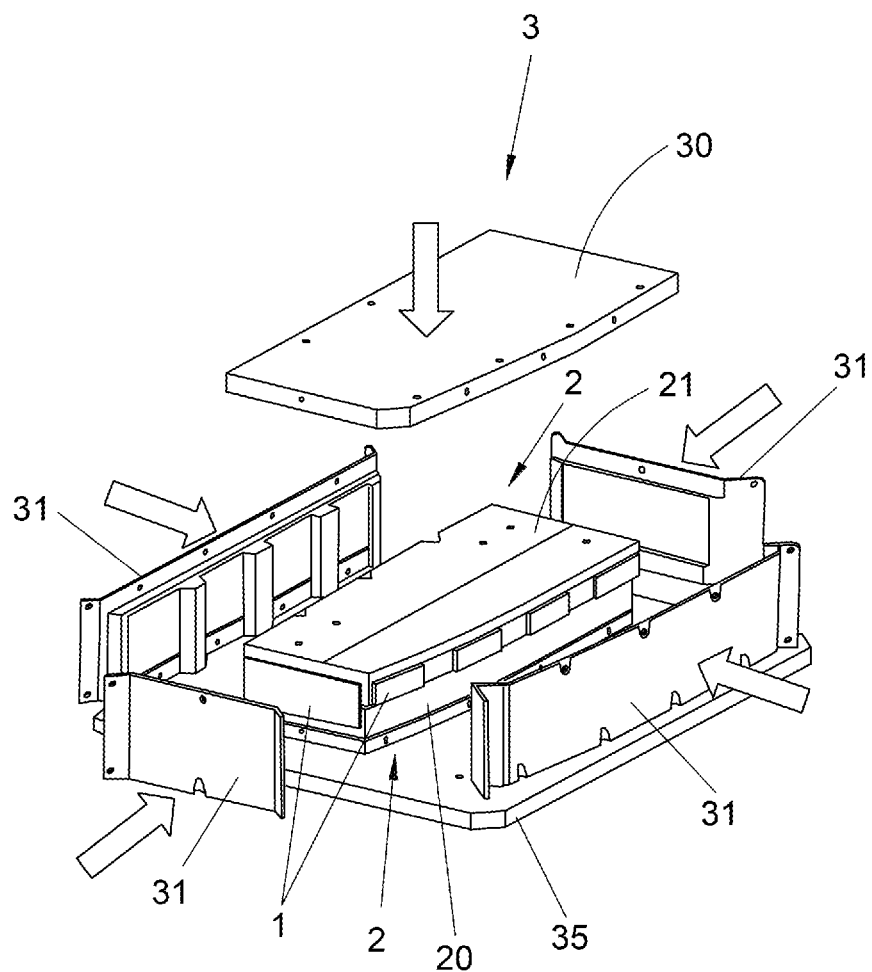
FIG. 1 is a schematic perspective view of an embodiment of the invention in which a rib is formed.

FIG. 1 shows an embodiment of the device of the invention. The part to be cured is a rib having a web (11) and flanges (12). The molding die (2) comprises at least two matching parts, a base part (20) and an upper part (21) defining in-between themselves a cavity where the main body or the web (11) of the prepreg preform (1) is placed. The upper part (21) can be divided into several subparts to ease the demolding process. Lateral elements (31) are located surrounding the upper and base parts (20, 21) of the molding die (2) defining the flanges (12) of the rib.

Figure 2A:
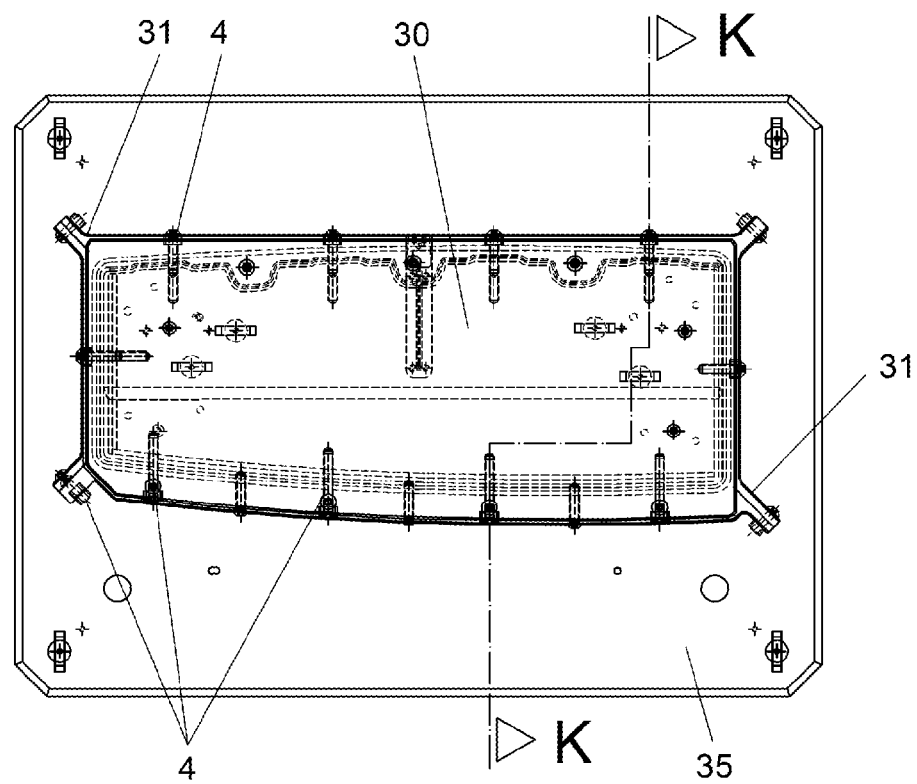
FIG. 2A is a schematic plan view of the embodiment shown in FIG. 1.
Figure 2B:
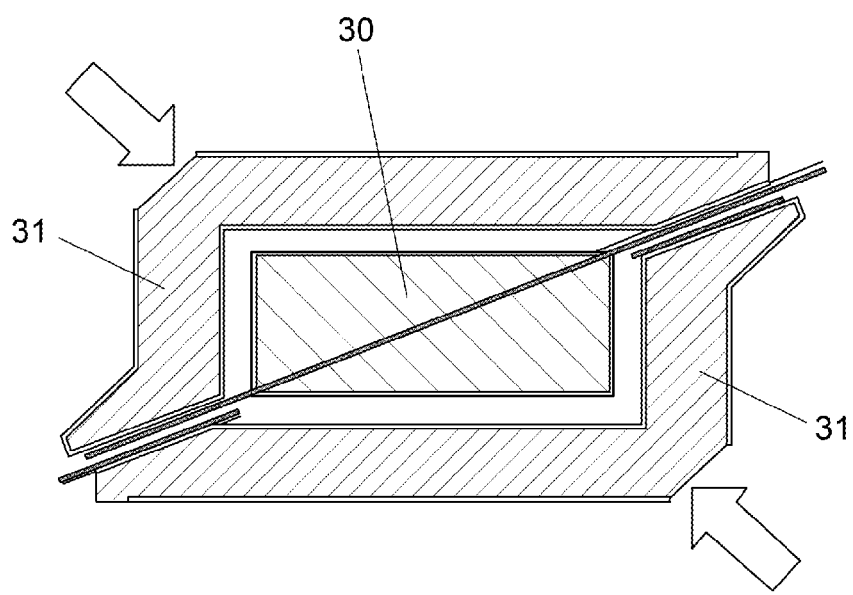
FIG. 2B is a schematic plan view of a second embodiment of the invention.
Figure 3:
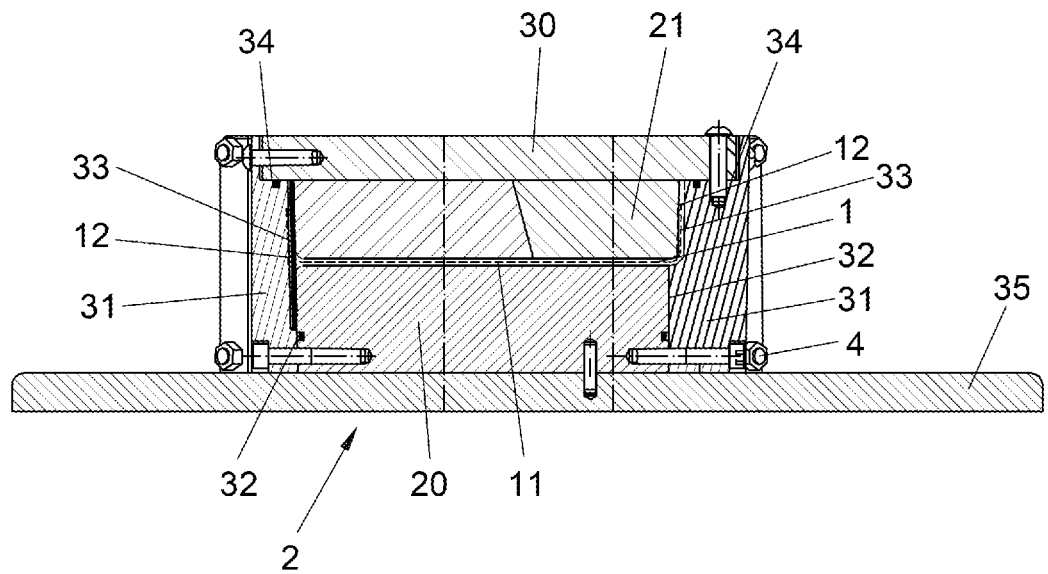
FIG. 3 is a lateral cross section of the embodiment shown in FIG. 1.
Figure 4:
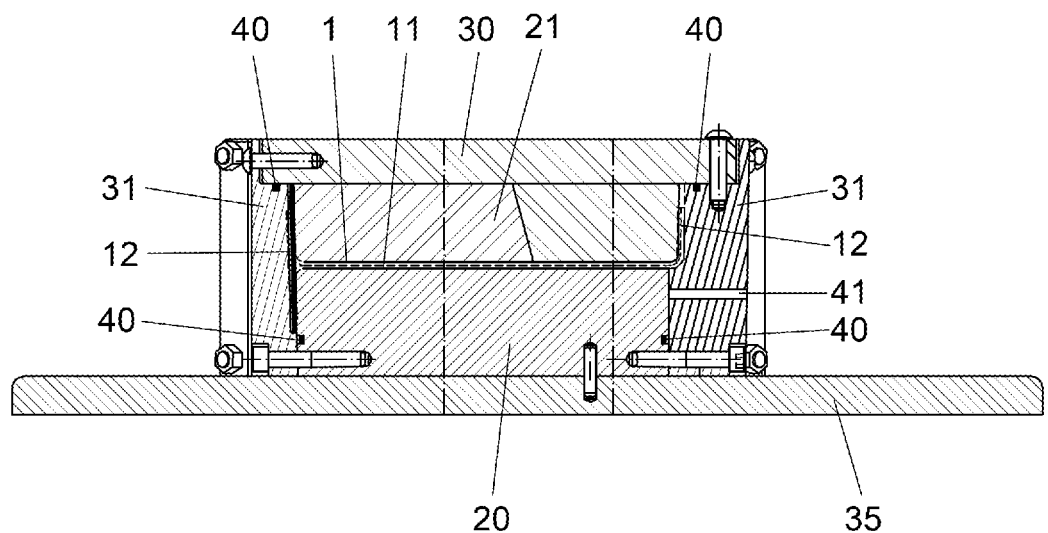
FIG. 4 is a lateral cross section showing an embodiment of the vacuum system.

The embodiment shown in FIG. 1 and FIG. 2A comprises four lateral parts (31) and the embodiment shown in FIG. 2B comprises two lateral parts (31). The lateral parts (31) are in contact with the base part (20) and the upper part (21) of the molding die (2).

Additionally it also comprises the step of placing an upper tool element (30) in contact with one of the two matching parts (20, 21) of the molding die (2) and bolting the upper tool element (30) so that the part (20, 21) is displaceable by said upper tool element (30) against the other matching part (20, 21) until said upper tool element (30) reaches the blocking means defining the composite part nominal thickness by the relative position between the two parts of the molding die (2).

Therefore it also comprises the step of displacing the molding die lateral parts (31) against the molding die base part (20) and upper part (21), in perpendicular direction to the flanges (12) of the prepreg preform (1) such that the molding die lateral parts (31) presses said flanges (12) and until they reach a blocking means defining the position of the lateral parts (31) for giving the flange (12) of the prepreg preform (1) the nominal thickness of the cured part, wherein said displacement is achieved by bolting the different parts of the molding die (2) against each other.

In the embodiment shown in the figures, the lateral parts (31) comprise an inner wall (32) having a recess (33) for accommodating the flange (12) of the prepreg preform (1), said inner wall (32) acting as a blocking means of the displacement of the lateral parts (31) against the upper and lower parts (20, 21) configured such that the lateral parts (31) are bolted until said inner wall (32) reaches the upper or lower part (20, 21) of the molding die (2). The inner wall (32) also has an upper portion and a lower portion, said lower portion acting as a blocking means and said upper portion configured for accommodating the flange (12) of the preform (1).

The lateral parts (31) also comprises an upper recess (34) for receiving the upper tool element (30), said upper recess (34) defining the blocking means of the downward movement of the upper tool element (30) against the molding die (2) up to the nominal thickness of the prepreg preform (1).

The embodiment shown in the figures discloses that the upper tool element (30) is bolted against the lateral parts (31) for displacing the upper part (21) in perpendicular direction to the plane of the prepreg preform (1). It also discloses that the lateral parts (31) are bolted against the molding die base part (20) and also against the upper tool element (30). Thus, the upper tool element (30) presses the laminated preform (1) in perpendicular direction to its plane and the lateral parts (31) press the flanges (12) of the preform (1) also in the perpendicular direction to their planes.

Moreover, additional advantages of the configuration shown in the figures are that bolts (4) do not damage the laminated preform (1) as they extend between parts of the molding die (2) or between tool modules (30) and molding die (2) and that the blocking means are defined by the shape between tool modules (3) or between tool modules (3) and molding die (2).

The embodiment shown in the figures also comprises a tooling base (35) located under the molding die (2).

Both the molding die (2) and the set of tool elements (3) are made of the same material, more specifically metallic.

As previously stated, the method of the invention requires intermediate debulking processes, in order to ensure that the air trapped is removed from the prepreg preform (1).

In order to clear the entrapped air from the prepreg preform (1) a combination of pressure, vacuum and temperature to reduce the resin viscosity that allows the movement of the air through the prepreg preform (1) towards the vacuum outlets should be applied during the debulking processes.

The rib shown in the figures is made of a preform and the debulking process could be carried out in the preform and it could also be repeated once it is integrated to build the rib in the tooling set.

In a first embodiment, the set molding die (2) is closed by a debulking bag, for instance a sealed nylon bag, against the tooling base (35) therefore pressure is not applied. In a second embodiment pressure is also applied to promote forces that lead the air outside the prepreg preform (1). The molding die (2) closes in an airtight manner. Therefore, it would not be necessary to have a vacuum bag, as the molding die (2) would be sealed. Additionally, the molding die (2) can be bolted so that the debulking is improved by applying pressure to the prepreg preform (1).

To seal the molding die (2) two seals (40) are located between the molding die upper part (30) and the lateral modules (31). To extract the trapped air, holes are made to the lateral parts (31) that communicate the space where the prepreg preform (1) is hosted with abroad. These drills are covered with a membrane to prevent the exit of resin, but not air. The drills are also threaded to place an air port to extract the air. A vacuum port (41) is also drill into the lateral part (31).

Once the debulking is completed, the molding die (2) is closed.

Final position of the different parts of the molding die (2) is verified by coordinated pins through the metallic elements involved, using the tooling base (35) as a position reference element.

Bolting torque is not a critical parameter, since the displacement of each of the parts of the molding die (2) is limited by the blocking means. The number of bolts (4), size and dimension of the different parts of the molding die (2) shall be defined so they will be able to compress the prepreg preform (1) without suffering any deformation. The bolts (4) should be uniformly distributed along the contour of the lateral parts (31) to ensure a homogeneous contact between both elements without deformation of the parts involved. The upper tool element (30) provides a uniform pressure over the molding die (2) and therefore over the prepreg preform (1). The upper tool element (30) also provides a surface for bolting the screws without damaging the prepreg preforms (1).

Any deformation induced in the metallic elements during the assembly of all the elements that form the curing tool by bolting the different elements will surely affect the part geometry and its tolerances.

An optimized system should have a heating system integrated in the metallic frame elements since heat transmission would be more effective than using a standard oven, which will surely implies reducing processing costs.

In order to limit the resin flow outside the curing tool, it should also be necessary to seal all the metallic parts of the frame. Therefore, vacuum shall be integrated within the seal area in order to be effective as previously explained.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a composite part of an aircraft comprising the steps of:
    placing a prepreg preform in a molding die between at least a molding die base part and a molding die upper part, said molding die having a shape of the composite part to be produced, the prepreg preform comprising at least one web and at least one flange,
    debulking air trapped in the prepreg preform,
    displacing the molding die upper part downwards against the molding die base part, in a direction perpendicular to a plane of the prepreg preform such that the molding die upper part presses the prepreg preform until it reaches a blocking arrangement defining a position of the upper part relative to the base part for giving the prepreg preform a web nominal thickness of a cured composite part, wherein said displacement is achieved by bolting the upper and lower parts of the molding die against each other,
    displacing at least one molding die lateral part against at least one of the molding die base part and the molding die upper part, in a direction perpendicular to the at least one flange of the prepreg preform such that the at least one molding die lateral part presses said at least one flange and until the at least one molding die lateral reaches a blocking arrangement defining the position of the at least one molding die lateral for giving the at least one flange of the prepreg preform a flange nominal thickness of the cured composite part, wherein said displacement is achieved by bolting the at least one molding die lateral part with another part of the molding die,
    curing the prepreg preform at an elevated temperature.

2. The method according to claim 1, further comprising the steps of:
    placing an upper tool element in contact with the molding die upper part, and
    bolting said upper tool element to a part of the molding die such that the molding die upper part is displaced against the molding die base part.

3. The method according to claim 1, further comprising the step of:
    placing the at least one molding die lateral part such that the flange is located in-between the at least one molding die lateral part and the molding die upper part and the molding die base part.

4. The method according to claim 1, wherein the molding die comprises a plurality of molding die lateral parts.

5. The method according to claim 4, wherein the molding die lateral parts each comprise an inner wall having a recess for accommodating a flange of the prepreg preform, the contact between the inner wall and the molding die base part or the molding die upper part acting as a blocking arrangement of the displacement of the molding die lateral parts.

6. The method according to claim 4, wherein the molding die lateral parts each comprise an upper recess for receiving the upper tool element, said upper recess defining the blocking means of the upper tool element.

7. The method according to claim 4, wherein an upper tool element is bolted against each of the molding die lateral parts for displacing the molding die lateral parts.

8. The method according to claim 4, wherein the molding die lateral parts are each bolted against the molding die base part.

9. The method according to claim 2, wherein the at least one molding die lateral part is bolted against the upper tool element.

10. The method according to claim 1, wherein at least one of the tooling element and the molding die comprise a heating system.

11. A method for manufacturing a composite part comprising:
    placing a prepreg preform comprising a web in a molding die, the molding die having a shape of the composite part to be produced and comprising a plurality of metallic parts,
    debulking air from the prepreg preform,
    displacing a first part from the plurality of metallic parts in a first direction by bolting the first part against a second part from the plurality of metallic parts such that the first part presses the prepreg preform until the first part reaches a blocking arrangement defining a position of the first part relative to the second part for providing the prepreg preform with a first nominal thickness of a cured composite part, and, displacing a third part from the plurality of metallic parts in a second direction by bolting the third part against a fourth part from the plurality of metallic parts such that the first part presses the prepreg preform until the third part reaches a blocking arrangement preform with a second nominal thickness of a cured composite part, wherein the second direction is perpendicular to the first direction, curing the prepreg preform at an elevated temperature to form the cured composite part.

12. The method of claim 11, wherein the prepreg is cured by a heating system that is integrated with the molding die.

13. The method of claim 11, wherein the first part from the plurality of parts comprises an upper part, and wherein the second part comprises a base part.

14. The method of claim 13, wherein the third part from the plurality of parts and the fourth part from the plurality of parts both comprise a lateral part.

* * * * *